United States Patent [19]

Takahashi

[11] Patent Number: 5,381,705
[45] Date of Patent: Jan. 17, 1995

[54] REAR WHEEL STEERING APPARATUS FOR FOUR-WHEEL STEERING VEHICLE

[75] Inventor: Akira Takahashi, Oota, Japan

[73] Assignee: Fuji Jukogyo Kabushiki Kaisha, Tokyo, Japan

[21] Appl. No.: 111,789

[22] Filed: Aug. 26, 1993

[30] Foreign Application Priority Data

Sep. 4, 1992 [JP] Japan .................. 4-068535[U]

[51] Int. Cl.⁶ .................. B62D 5/04; B62D 3/04
[52] U.S. Cl. .................. 74/498; 74/104; 180/140; 280/91
[58] Field of Search .................. 74/104, 498; 180/140; 280/91

[56] References Cited

U.S. PATENT DOCUMENTS

| | | | |
|---|---|---|---|
| 4,779,880 | 10/1988 | Hyodo | 74/498 X |
| 5,078,018 | 1/1992 | Saita et al. | 180/140 X |
| 5,131,485 | 7/1992 | Io et al. | 280/91 X |

Primary Examiner—Allan D. Herrmann
Attorney, Agent, or Firm—Beveridge, DeGrandi, Weilacher & Young

[57] ABSTRACT

A crank spindle formed with an eccentric pin at one end thereof is pivotally supported by bearings within a casing. The crank spindle is driven by a motor and a worm mechanism. A cross pin member formed with an upper axle and a lower axle is pivotally fitted to the eccentric pin of the crank spindle. An upper holder is fitted to the upper axle of the cross pin member and a lower holder is fitted to the lower axle thereof. A steering bar is fastened to the lower holder. When the eccentric pin is pivoted by the motor and the worm mechanism, since the cross pin member is pivoted, the upper and lower holders are also pivoted to shift the steering bar in the horizontal direction. The rear wheel steering apparatus can be installed within a small space.

7 Claims, 4 Drawing Sheets

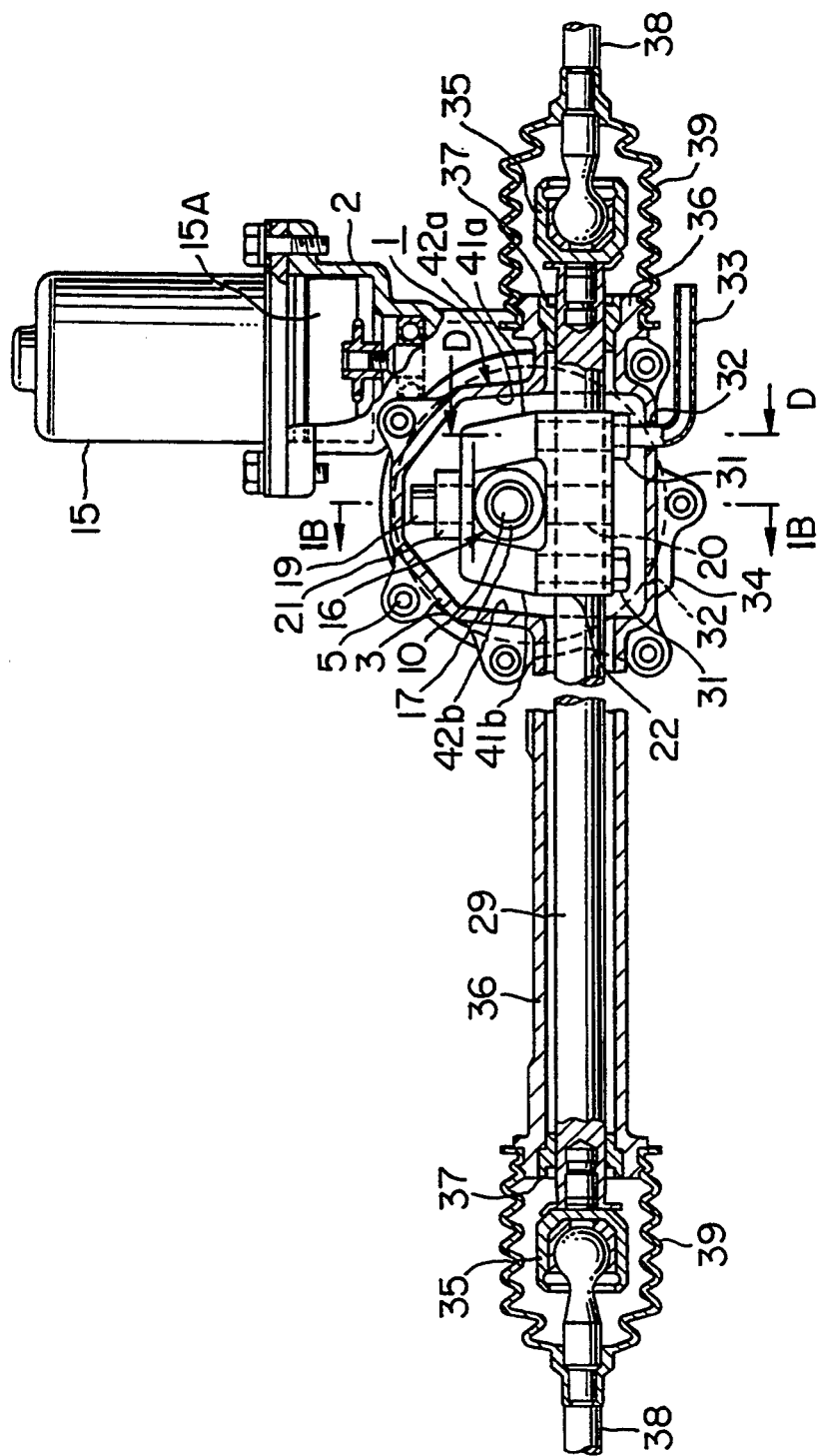
FIG. IA

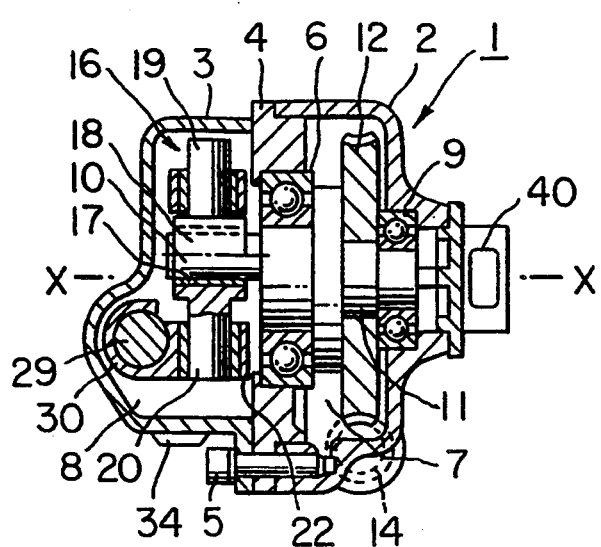
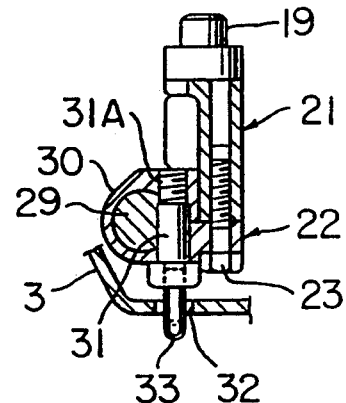
FIG. 1B
FIG. 1D
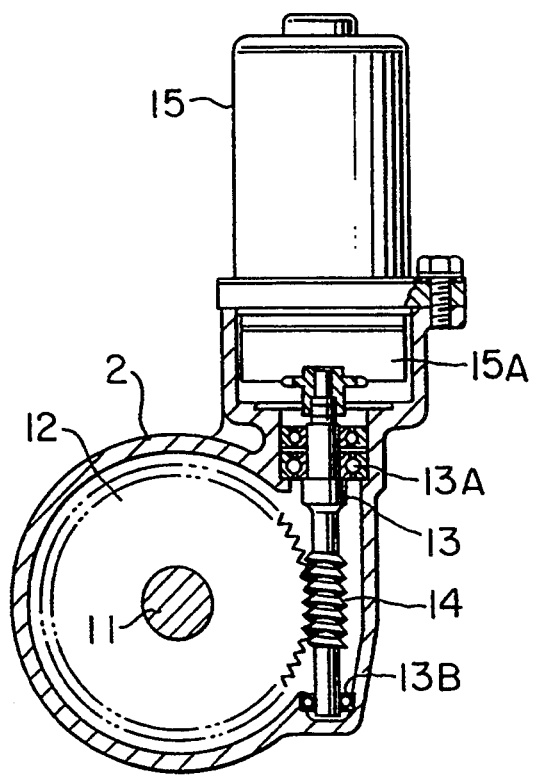
FIG. 1C

REAR WHEEL STEERING APPARATUS FOR FOUR-WHEEL STEERING VEHICLE

BACKGROUND OF THE INVENTION

1. Field of the Invention

The present invention relates to a rear wheel steering apparatus for a four-wheel steering vehicle.

2. Description of the Prior Art

A four-wheel steering vehicle is such a vehicle that whenever the front wheels are steered, an actuator is actuated to steer the rear wheels simultaneously.

FIG. 5 shows an example of a prior art rear wheel steering apparatus which is disclosed in Utility Model Laid Open Publication application Ser. No. 145773/1989. In FIG. 5, a pair of right and left steering axles 51R and 51L are pivotally supported on a fixed frame 50 via bearings. The steering axles 51R and 51L are formed with right and left levers 52R and 52L, respectively. Ends of these two levers 52R and 52L are linked with each other by a connecting rod 53. Further, the steering axles 51R and 51L are provided with right and left eccentric pins 54R and 54L, respectively. Right and left suspension links 55R and 55L are connected to the eccentric pins 54R, 54L via pins, respectively. Further, the lever 52R is connected to an output shaft of a motor 56.

In operation, when a rear wheel steering command signal is applied from a controller (not shown) to the motor 56, the right and left steering axles 51R and 51L are pivoted by the motor 56, respectively in synchronism with each other. Therefore, the right and left eccentric pins 54R and 54L are pivoted by a predetermined angle, so that the right and left suspension links 55R and 55L are shifted in the right and left directions, respectively to steer the rear right and left wheels, respectively.

In the above-mentioned rear wheel steering apparatus, however, there exist some problems in that it is rather difficult to secure high precision uniformly on the right and left sides in processing and in assembly of the eccentric pins 54R and 54L, the levers 52R and 52L, the suspension links 55R and 55L, the connecting rod 53, etc. In addition the productivity is low because a relatively large cast casing (not shown) for housing and supporting these elements is required. Further, there exists another problem in that a large space is required to mount the connecting rod 53, because the connecting rod 53 is inevitably oscillated up and down.

SUMMARY OF THE INVENTION

With these problems in mind, therefore, it is an object of the present invention to provide a rear wheel steering apparatus for a four-wheel steering vehicle small in installation space and an excellent in steering function.

To achieve the above-mentioned object, the present invention provides a rear wheel steering apparatus for a four-wheel steering vehicle, comprising: a casing; a crank spindle pivotally supported in said casing and formed with an eccentric pin on one end thereof; a driving mechanism for driving said crank spindle; a cross pin member pivotally fitted to the eccentric pin of said crank spindle and formed with upper and lower axles extending radially in two opposite directions; an upper holder fitted to the upper axle of said cross pin member; a lower holder fitted to the lower axle of said cross pin member; and a steering bar fastened to said lower holder.

In the rear wheel steering apparatus, the casing is composed of a first casing and a second casing; a bearing bracket is interposed at an interface between the first and second casings so as to separate an inner casing space into a first chamber and a second chamber; and a bearing provided with sealing function is attached to the bearing bracket.

The driving mechanism comprises a motor; a worm gear driven by said motor; and a worm wheel fixed to said crank spindle and in mesh with said worm gear.

The upper holder and said lower holder are fastened to each other with bolts screwed from the side of said lower holder.

The steering bar is fastened to said lower holder with bolts screwed from below.

The casing is formed with at least one inspection hole for detecting a neutral position of the eccentric pin of said crank spindle on the basis of positional matching of the inspection hole with a head of the bolt for fastening said steering bar to said lower holder.

Further, the maximum strokes of said steering bar on both right and left sides are determined in dependence upon contact of both outer side surfaces of said upper holder with both inner side surfaces of said casing, respectively.

In the rear wheel steering apparatus for a four-wheel steering vehicle according to the present invention, the apparatus is simple in construction and small in installation space, as compared with the prior art rear wheel steering apparatus. Further, since sufficient rear wheel steering operation can be achieved even when the dimensional precision and the angular precision about the axis of the steering bar and the eccentric pin are not strict both in the front and rear direction and the vertical direction, it is possible to easily manufacture the respective parts or elements, thus reducing the manufacturing cost thereof and facilitating the assembling cost thereof. In addition, since the load applied from the rear wheels via the tie-rods can be supported by the upper and lower axles of the cross pin member, it is possible to effectively receive the load at a high load supporting strength and rigidity.

BRIEF DESCRIPTION OF THE DRAWINGS

FIG. 1A is a longitudinal cross-sectional view showing one embodiment of the rear wheel steering apparatus for a four-wheel steering vehicle according to the present invention;

FIG. 1B is a cross-sectional view taken along the line 1B—1B shown in FIG. 1A;

FIG. 1C is a cross-sectional view showing a motor and a motor driven mechanism of the steering apparatus shown in FIG. 1A;

FIG. 1D is a cross-sectional view taken along the line 1D—1D shown in FIG. 1A;

DETAILED DESCRIPTION OF THE PREFERRED EMBODIMENTS

Figure 2A:
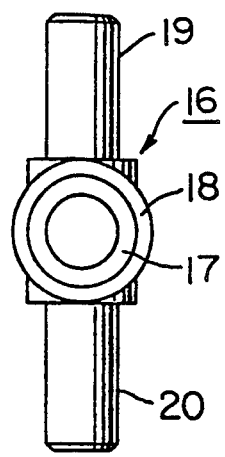
FIG. 2A is a front view showing a cross pin member of the steering apparatus shown in FIG. 1A.
Figure 2B:
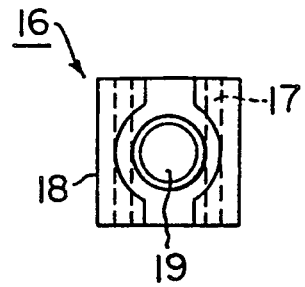
FIG. 2B is a top view showing the same cross pin member shown in FIG. 2A.

A preferred embodiment of the present invention will become understood from the following detailed description referring to the accompanying drawings.

The rear wheel steering apparatus of the present invention comprises a casing 1, a crank spindle 11 rotatably housed in the casing 1 and formed with an eccentric pin 10 at one end thereof, a motor 15 and a driving mechanism 14 and 12 for driving the crank spindle 11, a cross pin member 16 pivotally fitted to the eccentric pin 10 of the crank spindle 11, an upper holder 21 fitted to an upper axle 19 of the cross pin member 16 and a lower holder 22 fitted to a lower axle 20 of the same cross pin member 16, and a steering bar 29 fastened to the lower holder 22.

With reference to FIGS. 1A and 1B, the casing 1 for housing the essential composing elements of the rear wheel steering apparatus is composed of a first casing 2 and a second casing 3 both splittable from each other. A bearing bracket 4 is interposed and fixed between the first and second casing 2 and 3 with a plurality of bolts 5. Further, a ball bearing 6 provided with a sealing function is attached to the inner side of the bearing bracket 4, in such a way that the inner space within the casing 1 is divided into a first chamber 7 and a second chamber 8. Further, another ball bearing 9 is attached at the central inner position of the first casing 2.

As depicted in FIG. 1B, the crank spindle 11 formed with the eccentric pin 10 is supported by the two ball bearings 6 and 9 so as to be rotated about an axis X—X of the casing 1. A worm wheel 12 is fixed to the axle portion of the crank spindle 11 so as to be housed within the first chamber 7 of the first casing 2. As shown in FIG. 1C, a worm gear 14 is formed in a worm shaft 13 rotatably supported by the first casing 2 via two ball bearings 13A and 13B. The worm gear 14 is in mesh with the worm wheel 12. An output shaft of the motor 15 is connected to an end of the worm gear 13 via a well-known reduction gear 15A.

The eccentric pin 10 of the crank spindle 11 extends into the second chamber 8 of the second casing 3, as shown in FIG. 1B. The cross pin member 16 as shown in FIG. 2A is pivotally fitted to this eccentric pin 10 via a bush 17. This cross pin member 16 is formed with a central head portion 18 and a pair of upper axle 19 and lower axle 20 extending radially from the head portion 18 in two opposite directions, as depicted in FIG. 2A.

Figure 3A:
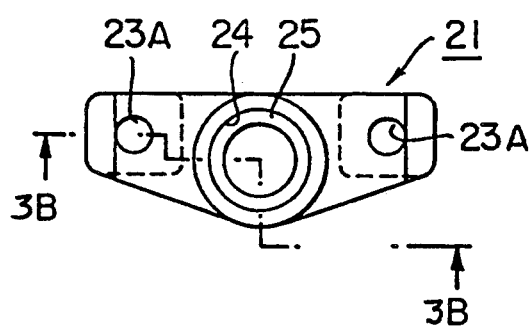
FIG. 3A is a top view showing an upper holder of the steering apparatus shown in FIG. 1A.
Figure 3B:
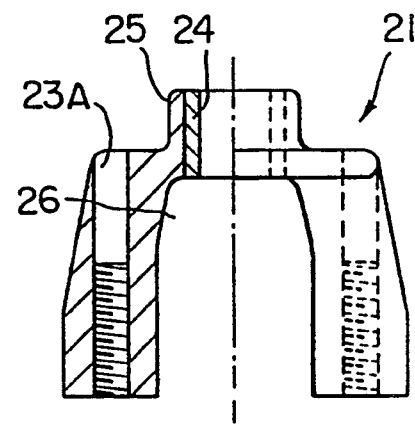
FIG. 3B is a cross-section view taken along the line 3B—3B shown in FIG. 3A.
Figure 4A:
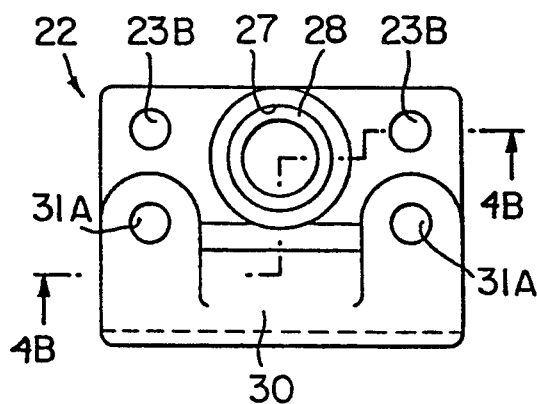
FIG. 4A is a top view showing a lower holder of the steering apparatus shown in FIG. 1A.
Figure 4B:
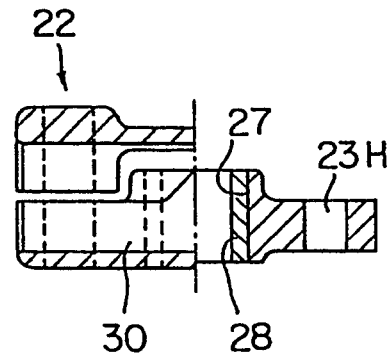
FIG. 4B is a cross-section view taken along the line 4B—4B shown in FIG. 3A.
Figure 5:
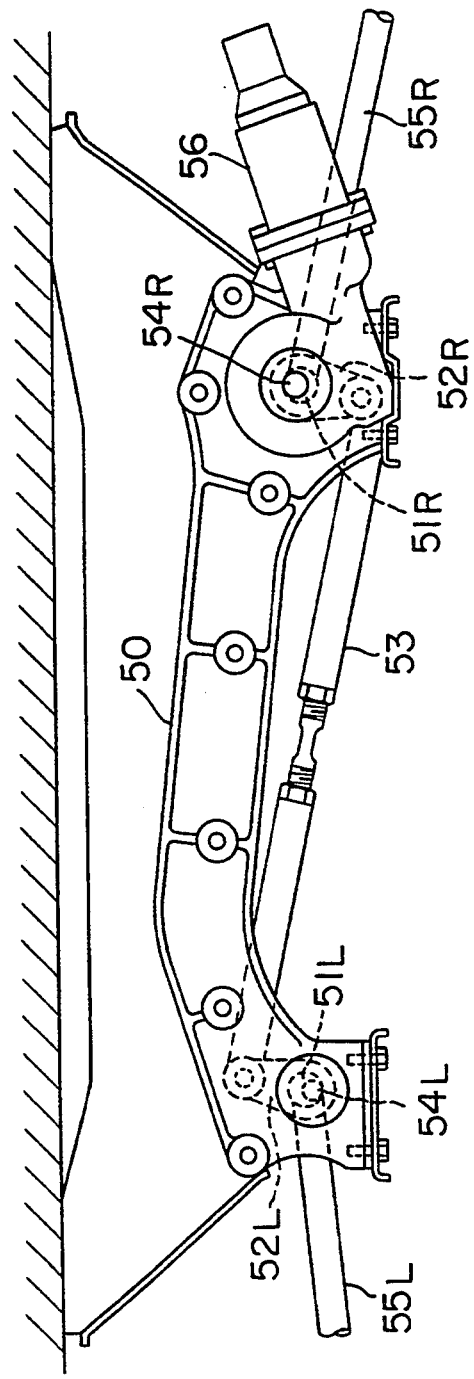
FIG. 5 is a front view showing a prior art rear wheel steering apparatus.

As shown in FIG. 1A, the upper holder 21 as shown in FIGS. 3A and 3B is fitted to the upper axle 19 of the cross pin member 16, and the lower holder 22 as shown in FIGS. 4A and 4B is fitted to the lower axle 20 of the cross pin member 16. The upper holder 21 is formed with two female screw holes 23A. On the other hand, the lower holder 22 is formed with two bolt holes 23B and two female screw holes 31A. These upper and lower holders 21 and 22 are fastened to each other with a pair of fixing bolt 23 screwed into the female screw holes 23A and 23A of both the upper and lower holders 21 and 22, respectively. Further, as shown in FIGS. 3A and 3B, the upper holder 21 is formed with an upper hole 24 for receiving the upper axle 19 of the cross pin member 16 via a bearing bush 25 and with a large hollow cavity 26 below the bearing bush 25 so that the head portion 18 of the cross pin member 16 can be pivoted therewithin. On the other hand, as shown in FIGS. 4A and 4B, the lower holder 22 is formed with a lower hole 27 for receiving the lower axle 20 of the cross pin member 16 via a bearing bush 28 and provided with a clamp member 30 for fastening the steering bar 29. This clamp member 30 fastens the steering bar 29 having a flat surface portion with two fastening bolts 31 screwed into the two female screw holes 31A in such a way that the fastening bolts 31 are brought into contact with the flat surface portion of the steering bar 29, as shown in FIG. 1D.

Here, when a line connecting between the rotational center of the crank spindle 11 and the rotational center of the eccentric pin 10 is located in the vertical direction in FIG. 1A, this position is referred to as a neutral position of the crank spindle 11 or the steering apparatus. The second casing 3 is formed with two inspection holes 32 at such positions as to face to just under the heads of the fastening bolts 31 (for fastening the steering bar 29) at this neutral position of the crank spindle 11. Accordingly, it is possible to inspect the neutral position of the crank spindle 11 from the outside, when the two inspection holes 32 match the pivotal positions of the two fastening bolts 31. In this inspection, it is convenient to use a hexagonal wrench 33 and to insert this hexagonal wrench 33 through the inspection hole 32 from below, as shown in FIGS. 1A and 1D. These inspection holes 32 are usually closed by use of closing plugs 34 (shown in FIG. 1A).

As shown in FIG. 1A, the steering bar 29 extends in the horizontal direction passing through both the side walls of the second casing 3, and covered with a cover cylinder 36. Right and left ball joints 35 are attached to both ends of the steering bar 29, respectively and covered with right and left bellows 39, respectively. Right and left bearing bushes 37 are attached to both ends of the cover cylinder 36, respectively. Further, right and left tie-rods 38 are connected to the right and left ball joints 35, respectively. Two right and left steering knuckle arms (not shown) are connected to the ends of the right and left tie-rods 38, respectively, so that when the steering bar 29 is moved right and left in the axial direction thereof, both the rear wheels can be steered. Further, a rear wheel steering angle sensor 40 is attached to the outer surface of the first casing 2 (as shown in FIG. 1B) to detect the angular position of the crank Spindle 11.

The operation of the rear wheel steering apparatus thus constructed will be described hereinbelow. In response to a front wheel steering information signal, a controller (not shown) determines a target rear wheel steering angle on the basis of the information signal and generates a rear wheel steering command signal. In response to this rear wheel steering command signal, the motor 15 begins to rotate so that the crank spindle 11 is pivoted about the axis X—X thereof via the worm gear 14 and the worm wheel 12. Accordingly, since the eccentric pin 10 is pivoted by a predetermined angle about the axis X—X of the crank spindle 11, the upper holder 21 and the lower holder 22 both fitted to the eccentric pin 10 are shifted together toward the right or left side, with the result that the steering bar 29 is shifted by a predetermined distance in the horizontal direction toward the right or left side for rear wheel steering. The angular position of the crank spindle 11 is detected by the rear wheel steering angle sensor 40. When the actual angular position detected by the rear wheel steering angle sensor 40 matches the target value, the controller stops driving the motor 15 in response to a match signal applied by the angle sensor 40.

As described above, the steering bar 29 is moved in the horizontal direction toward the right and left sides by the eccentric rotation of the eccentric pin 10 of the crank spindle 11. In this case, the maximum stroke of the steering bar 29 in both the right and left directions can be determined by the contact of the right and left outer side surfaces 41a and 41b of the upper holder 21 with the right and left inner side surfaces 42a and 42b of the second casing 3. In other words, the maximum stroke of the steering bar 29 can be determined on the basis of the position of the inner side surfaces 42a and 42b of the second casing 3, respectively.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A rear wheel steering apparatus for a four-wheel steering vehicle, comprising:
   a casing;
   a crank spindle rotatably supported in said casing and formed with an eccentric pin on one end thereof;
   a driving mechanism for driving said crank spindle;
   a cross pin member pivotally fitted to the eccentric pin of said crank spindle and formed with upper and lower axles extending radially in two opposite directions;
   an upper holder fitted to the upper axle of said cross pin member;
   a lower holder fitted to the lower axle of said cross pin member; and
   a steering bar fastened to said lower holder.

2. The rear wheel steering apparatus for a four-wheel steering vehicle according to claim 1, wherein said casing is composed of a first casing and a second casing; a bearing bracket is interposed at an interface between the first and second casings so as to separate an inner casing space into a first chamber and a second chamber; and a bearing provided with sealing function is attached to the bearing bracket.

3. The rear wheel steering apparatus for a four-wheel steering vehicle according to claim 1, wherein said driving mechanism comprises a motor; a worm gear driven by said motor; and a worm wheel fixed to said crank spindle and in mesh with said worm gear.

4. The rear wheel steering apparatus for a four-wheel steering vehicle according to claim 1, wherein said upper holder and said lower holder are fastened to each other with bolts screwed from the side of said lower holder.

5. The rear wheel steering apparatus for a four-wheel steering vehicle according to claim 1, wherein said steering bar is fastened to said lower holder with bolts screwed from below.

6. The rear wheel steering apparatus for a four-wheel steering vehicle according to claim 5, wherein said casing is formed with at least one inspection hole for detecting a neutral position of the eccentric pin of said crank spindle on the basis of positional matching of the inspection hole with a head of the bolt for fastening said steering bar to said lower holder.

7. The rear wheel steering apparatus for a four-wheel steering vehicle according to claim 1, wherein a maximum stroke of said steering bar on both right and left sides is determined in dependency upon contacting both outer side surfaces of said upper holder with both inner side surfaces of said casing, respectively.

* * * * *